Figure 1:
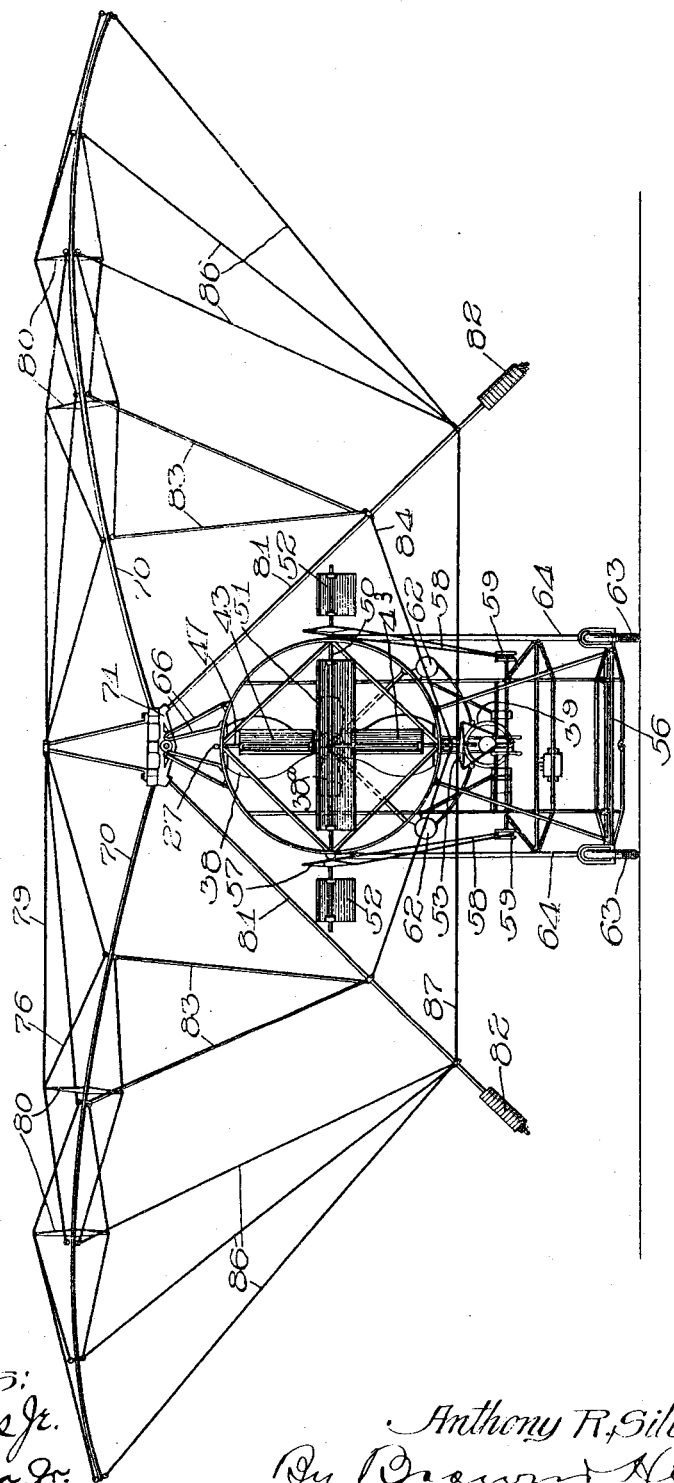

A. R. SILVERSTON.
AIRSHIP.
APPLICATION FILED AUG. 22, 1908.

1,072,664.

Patented Sept. 9, 1913.
8 SHEETS—SHEET 1.

Witnesses:
Inventor:
Anthony R. Silverston
By Brown & Hopkins
Attys.

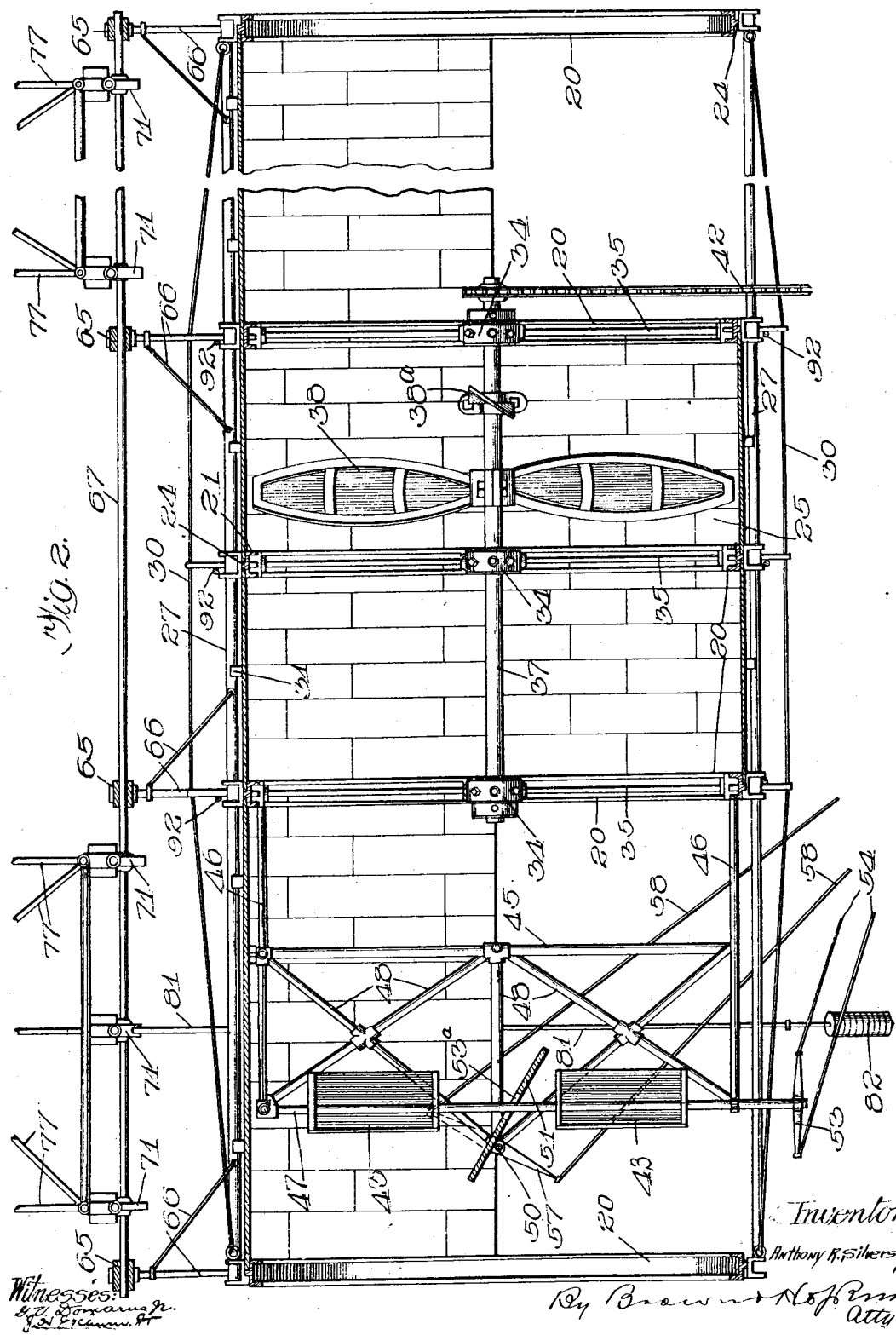

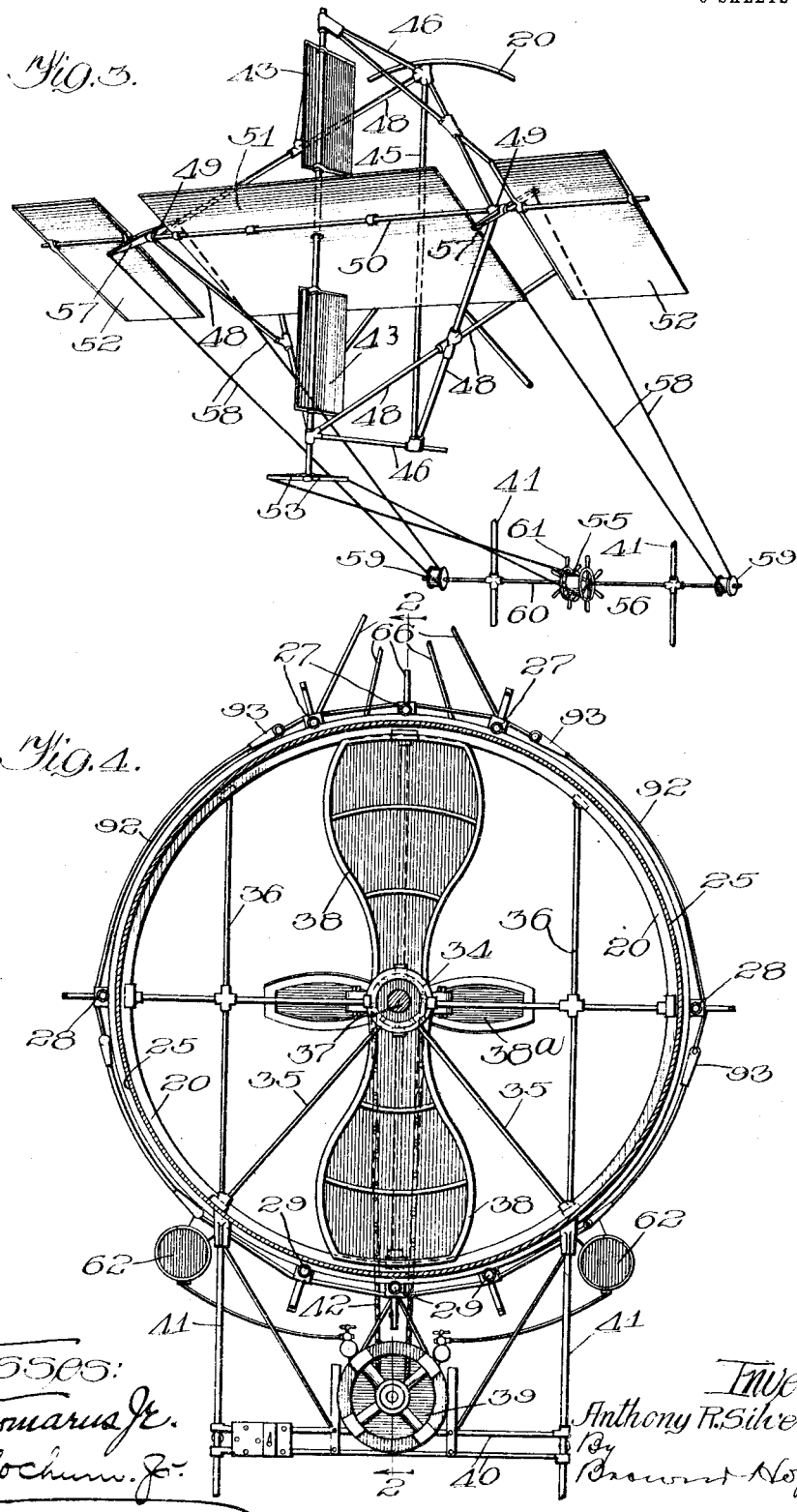

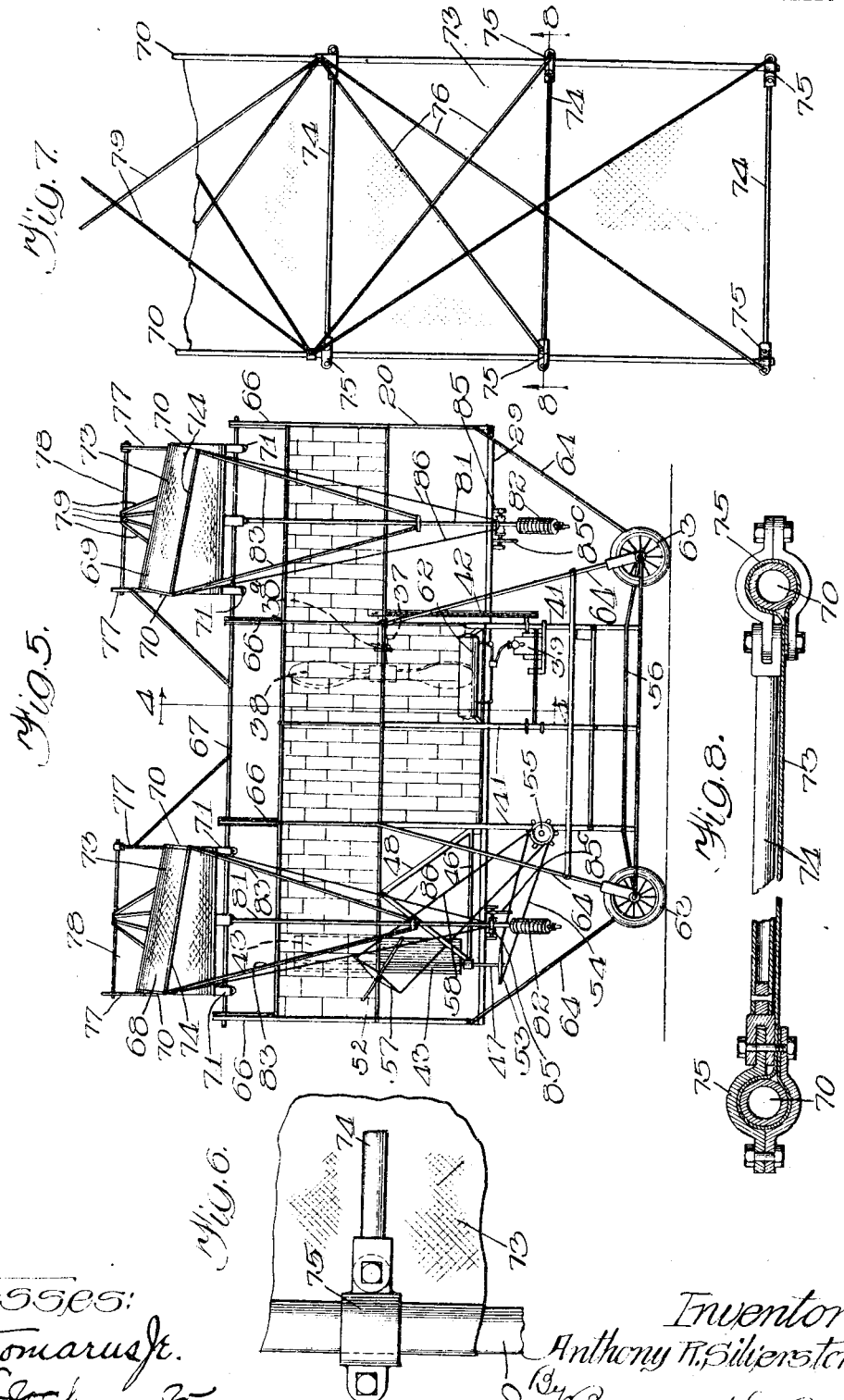
A. R. SILVERSTON.
AIRSHIP.
APPLICATION FILED AUG. 22, 1908.
1,072,664.
Patented Sept. 9, 1913.
8 SHEETS—SHEET 4.

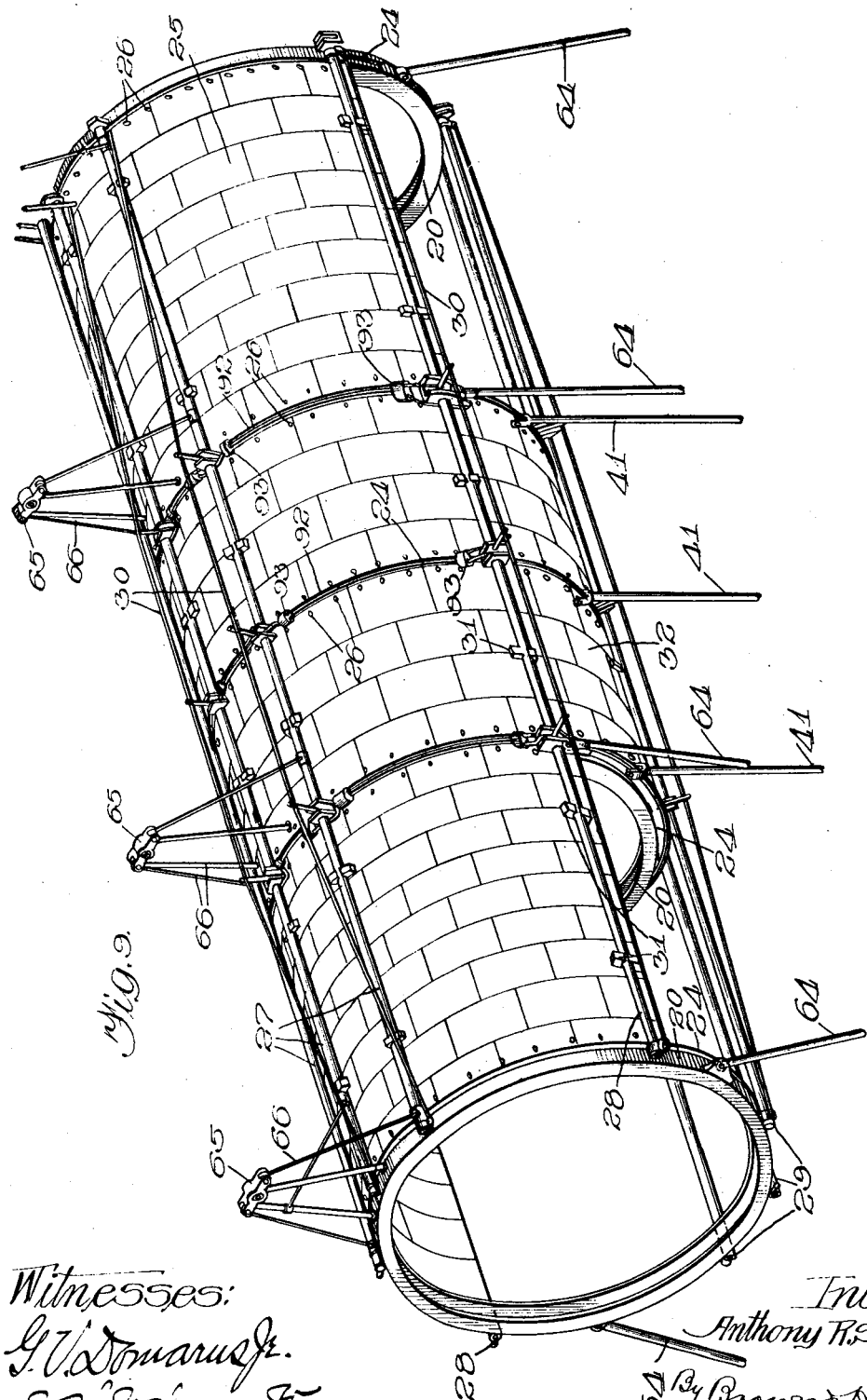

A. R. SILVERSTON.
AIRSHIP.
APPLICATION FILED AUG. 22, 1908.
1,072,664.
Patented Sept. 9, 1913.
8 SHEETS—SHEET 6.
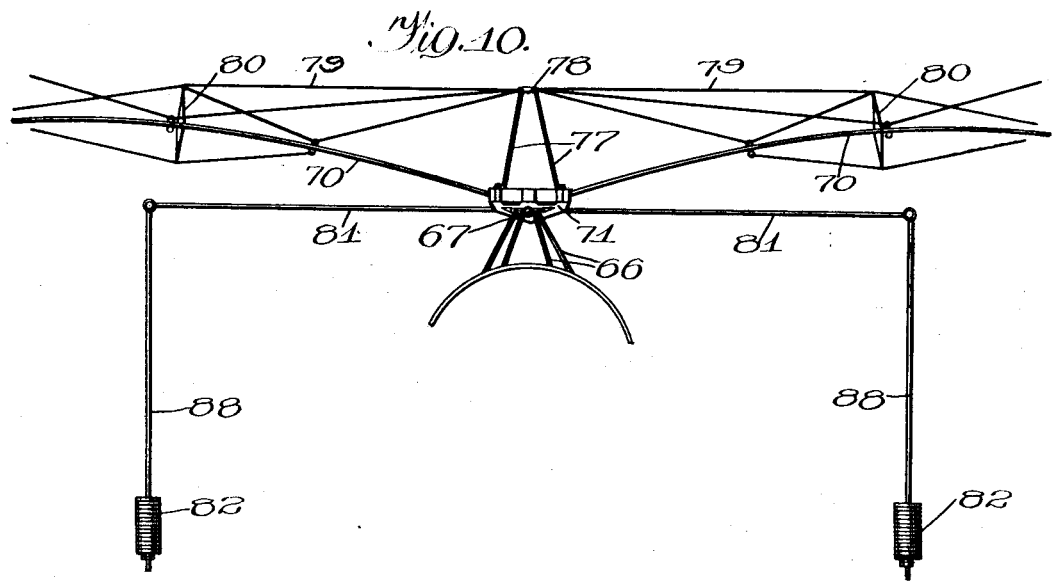
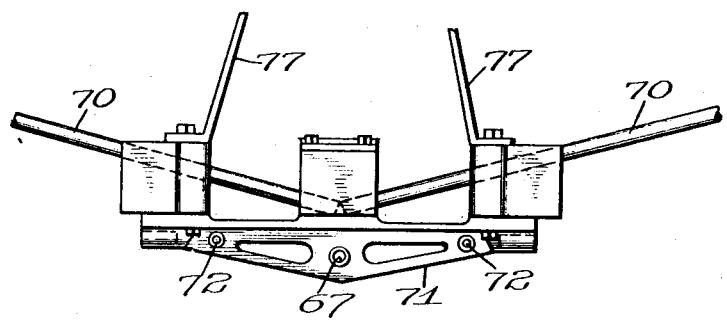
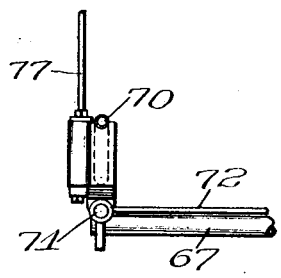
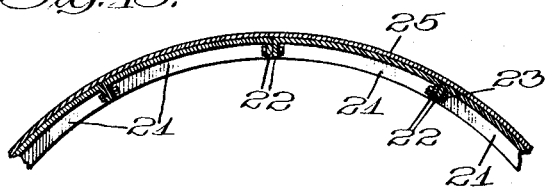
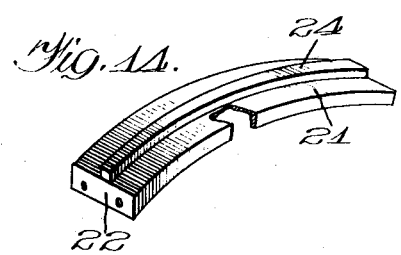
Witnesses:
Inventor:
Anthony R. Silverston
By Brown Hopkins
Attys A. R. SILVERSTON.
AIRSHIP.
APPLICATION FILED AUG. 22, 1908.
1,072,664.
Patented Sept. 9, 1913.
8 SHEETS—SHEET 7.
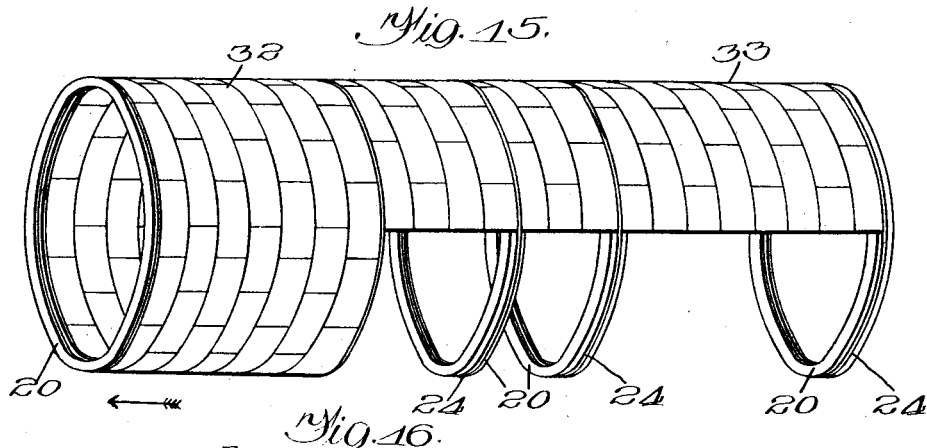
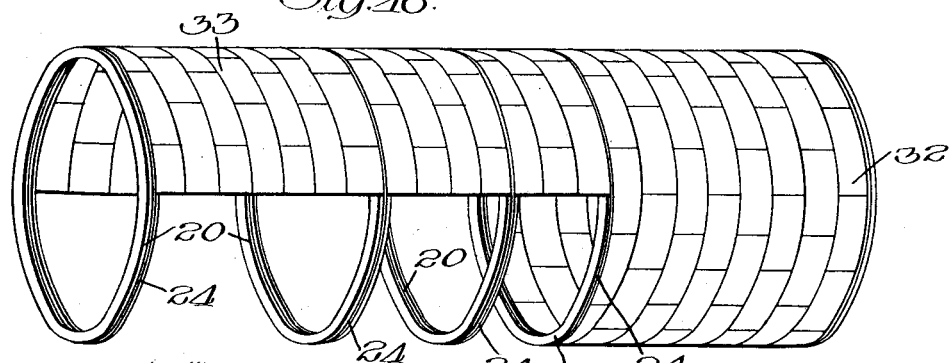
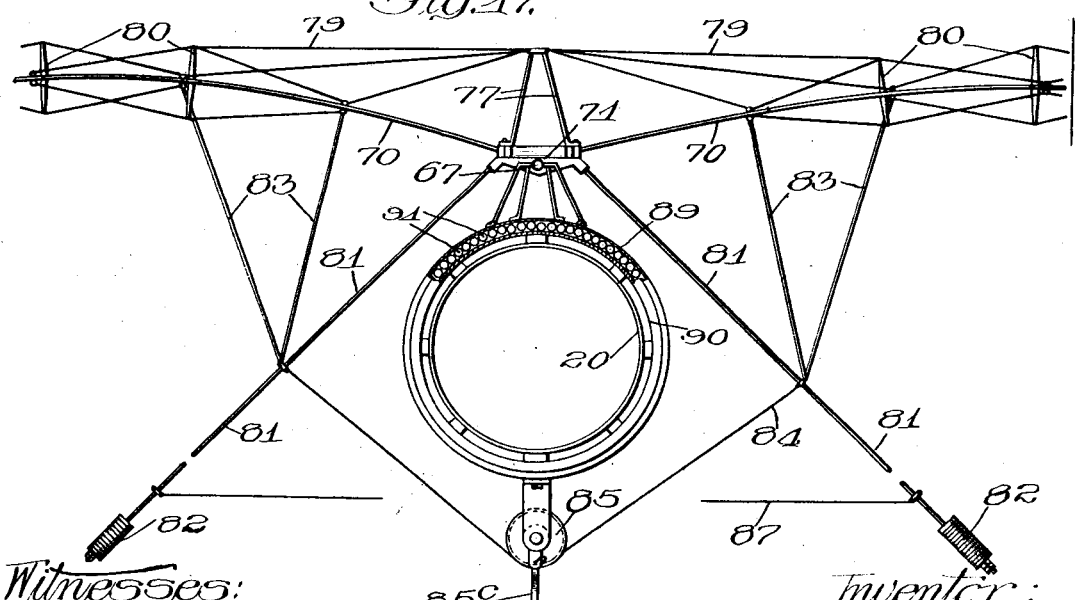
Witnesses:
Inventor:
Anthony R. Silverston.

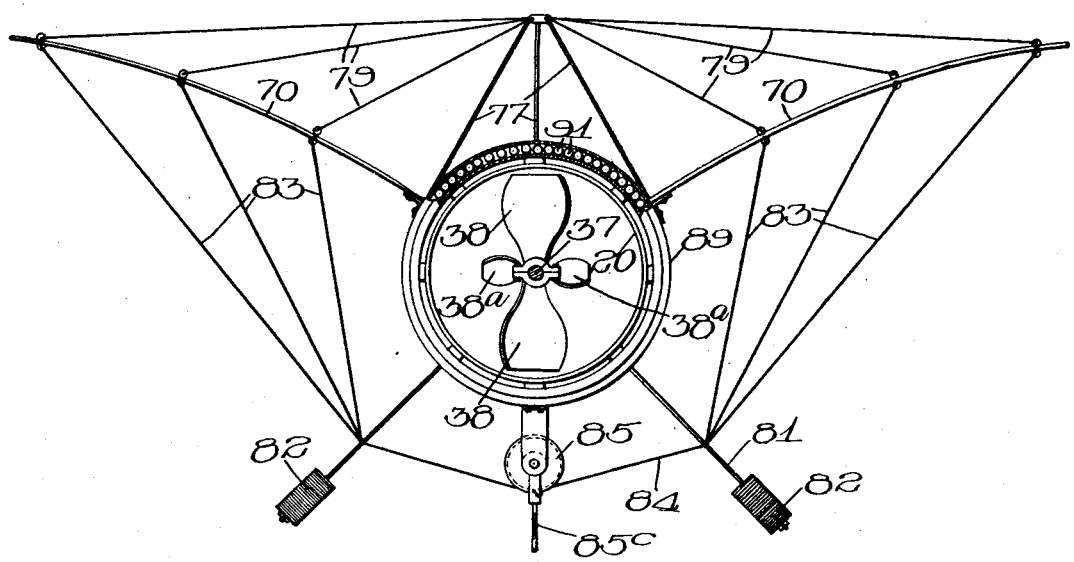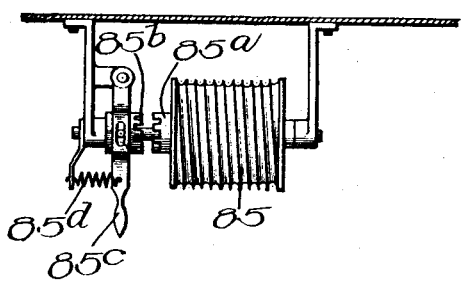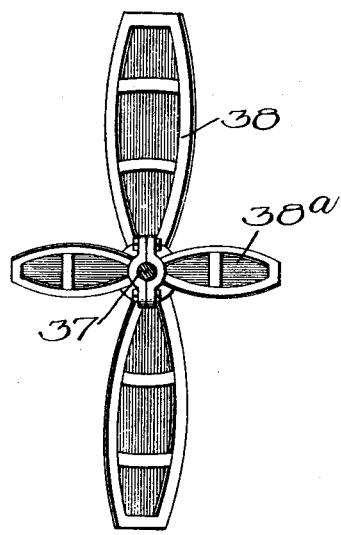

UNITED STATES PATENT OFFICE.

ANTHONY R. SILVERSTON, OF MILWAUKEE, WISCONSIN.

AIRSHIP.

1,072,664.

Specification of Letters Patent. Patented Sept. 9, 1913.

Application filed August 22, 1908. Serial No. 449,810.

*To all whom it may concern:*

Be it known that I, ANTHONY R. SILVERSTON, a citizen of the United States, residing at Milwaukee, in the county of Milwaukee and State of Wisconsin, have invented certain new and useful Improvements in Airships, of which the following is a specification.

This invention relates to improvements in air ships and one of the objects of the same is to provide an improved dirigible device of this character including a tubular body portion or tubular casing which is open at both ends and within which casing is located a propeller for forcing the outside air therethrough to suspend and propel the machine.

A further object is to provide an improved machine of this character including a tubular casing or body portion in which is mounted a propeller for forcing the air through the tubular portion, and improved means for overcoming the eddy currents created within the casing.

A further object is to provide an improved aeroplane attachment, and improved means for maintaining the equilibrium thereof.

A further object is to provide an improved machine of this character including an improved aeroplane attachment, and improved means whereby the aeroplane may be adjusted with respect to its support for causing the center of the wind pressure to always co-incide with the center of gravity of the machine.

A further object is to provide improved means for locking or holding the aeroplanes in a predetermined position.

A further object is to provide a device of this character in which the propeller will have a perfect gyroscopic action, thereby not only acting to propel the machine but also serving as a means for maintaining the equilibrium of the machine.

A further object is to provide an improved form of tubular body portion or casing within which the propeller is mounted and through which the air is adapted to be forced at a greater rate of speed than the speed of the outside air.

A further object is to provide an improved machine of this character which will be simple and durable in construction and effective and efficient in operation.

To the attainment of these ends and the accomplishment of other new and useful objects, as will appear, the invention consists in the features of novelty in the combination and arrangement of the several parts hereinafter more fully described and claimed and shown in the accompanying drawings illustrating the embodiment of the invention, and in which—

Figure 1 is an end elevation of an improved machine of this character constructed in accordance with the principles of this invention. Fig. 2 is an enlarged detail longitudinal sectional view of the tubular member or propeller casing taken on lines 2—2 of Fig. 4. Fig. 3 is a detail perspective view of the vertical and horizontally movable rudders or aeroplanes for steering the machine and the mechanism for operating the rudders. Fig. 4 is an enlarged detail sectional view taken on the line 4—4 of Fig. 5. Fig. 5 is a side elevation of Fig. 1. Fig. 6 is an enlarged detail top plan view of a portion of one of the arms of the aeroplanes showing the fastening means for one of the brace rods. Fig. 7 is a detail top plan view of a portion of one of the aeroplanes. Fig. 8 is a detail sectional view on line 8—8 of Fig. 7. Fig. 9 is a detail perspective view of one form of the tubular member or propeller casing. Fig. 10 is a detail end elevation of a modified form of the counterbalancing means for the aeroplanes. Fig. 11 is a detail elevation of the supporting member or knee for the aeroplanes. Fig. 12 is an end elevation of Fig. 11. Fig. 13 is an enlarged detail sectional view of a portion of the tubular member or propeller casing. Fig. 14 is a detail perspective view of one of the sections or elements of the supporting rings for the tubular member or propeller casing. Fig. 15 is a detail perspective view of a modified form of the propeller casing or tubular member. Fig. 16 is a detail perspective view of still another modified form of the tubular member or propeller casing. Fig. 17 is a detail end elevation partly in section showing a different manner of mounting the aeroplanes on the tubular body portion. Fig.

18 is a view similar to Fig. 17 of still another manner of mounting the aeroplanes. Fig. 19 is a detail elevation of a clutch mechanism for holding the aeroplanes in a predetermined position. Fig. 20 is a detail front elevation of the main propeller and the supplemental or auxiliary propeller for overcoming the eddy currents created by the main propeller.

Referring more particularly to the drawings, the tubular body portion or propeller casing preferably comprises spaced rings designated generally by the reference numeral 20, any number of which may be provided and in the present exemplification of the invention five of such rings are shown, three of which are located preferably adjacent the longitudinal center of the casing and the other two adjacent the ends thereof. Each of these rings comprise a plurality of sections 21, shown more clearly in Figs. 13 and 14 of the drawings. Each section is preferably of a channel shape as shown and the extremities 22 thereof are adapted to abut, as shown more clearly in Fig. 13, and may be secured together in any desired or suitable manner, such as by suitable fastening devices 23. These rings may be of any desired diameter and each section is provided with a rib or projection 24 extending longitudinally of each section and located intermediate the sides thereof so that when the sections 21 are assembled to form the respective ring, the rib will form a continuous projection extending beyond the periphery of the ring.

The body portion 25 may be constructed of any desired or suitable material but preferably of a light durable metal such as aluminum or the like and may be comprised of a plurality of sections secured together. The sections of the body thus formed are disposed between the respective rings and in such a manner that the extremities or ends of each section will rest upon the ring on one side of the rib or projection 24 and this rib or projection is of a height substantially equal to the thickness of the material and when the sections of the body portion are placed in position, the ends thereof may be secured to the respective ring in any desired or suitable manner, preferably by means of fastening bolts 26 which pass through the edges of the section and into the ring 20. The body portion 25, in the exemplification of the invention shown in Figs. 2, 5 and 9 is adapted to completely surround the innermost rings 20 to form a tubular portion and the extremities of the body intermediate the outermost rings and the respective inner ring surrounds only the upper portion of the rings to form an open hood or canopy which projects beyond the extremities of the tubular portion. The rings 20 may be connected by a plurality of tie rods or bolts 27, 28, 29, which extend longitudinally of the body portion and are secured to the periphery of the rings on the outside of the body to hold the rings spaced and to form braces for the casing. If desired, suitable guy rods 30 may be provided for bracing or holding the rods from buckling and suitable supports 31 may also be provided for the rods throughout the length thereof, which rest upon the outer face of the body portion.

In the exemplification of the invention shown in Fig. 15 of the drawings, the tubular portion, designated generally by the reference numeral 32, of the casing is arranged at the forward extremity thereof so that it will surround one of the outermost rings and the next adjacent ring, so that the hood or canopy, designated generally by the reference numeral 33 in this figure will be supported by the remaining rings and will project beyond the rear of the tubular body portion. In the exemplification shown in Fig. 16 the tubular body portion 32 is arranged to surround the two rings located at the rear, while the hood or canopy 33 is supported by the three rings at the other end of the machine so as to project beyond the forward end of the tubular body portion.

Arranged within the tubular portion of the propeller casing and at the diametric center of each ring, is a suitable bearing 34. Each of these bearings may be supported in any desired or suitable manner but preferably by means of supporting rods or braces 35, one extremity of each of which is secured to the respective ring, while the other extremity is secured to the respective bearing 34, as shown more clearly in Figs. 2 and 4 of the drawings, and if desired additional brace rods 36 may be provided for the rods 35.

Journaled in the bearings 34 is a propeller shaft 37, secured to which is a suitable propeller 38, which latter may be constructed in any desired or suitable manner and this propeller in the present exemplification of the invention preferably comprises two blades which are arranged diametrically opposite to each other and in a plane inclined to the longitudinal axis of the shaft at an angle of approximately 20° and the propeller is of a length to substantially fill the tubular casing.

Secured to the shaft 37 and at a suitable distance to the rear of the propeller 38 is an auxiliary or supplemental propeller 38ᵃ which propeller is preferably arranged at a right angle to the propeller 38 and also preferably comprises two blades arranged diametrically opposite to each other. The diameter of this propeller is somewhat less than the diameter of the main propeller 38 preferably one half the diameter and the blades thereof are also arranged in a plane inclined to the longitudinal axis of the shaft at an angle of about 35°. The supplemental or auxiliary propeller 38ª is spaced from the auxiliary propeller and arranged preferably at a distance of about one foot to the rear thereof and being disposed transversely with respect to the main propeller, it will be apparent that when the main propeller is rotated, the eddy currents which would be created at the center of the main propeller around the longitudinal shaft will be overcome by the auxiliary or supplemental propeller and the air instead of forming any currents will be forced out by the auxiliary or supplemental propeller to cause this portion of the air to flow in the same direction and at the same rate of speed as the speed of the air adjacent the wall of the casing. Motion may be imparted to the shaft 37 in any desired or suitable manner but in the present exemplification of the invention there is provided for this purpose a suitable motor 39, (shown more clearly in Fig. 4 of the drawings) which is preferably supported upon a suitable base or frame 40 suspended from the rings 20 in any desired or suitable manner, preferably by means of depending bars or rods 41 and this motor 39 has an operative connection with the propeller shaft 37 in any desired or suitable manner but in the present exemplification of the invention, the operative connection is shown as a sprocket or drive chain 42 which passes over a suitable sprocket on the motor shaft and a similar sprocket on the propeller shaft. The sprocket on the propeller shaft may be located in any desired position, either within the tubular portion or to a portion of the shaft which projects beyond the tubular portion of the casing. If the sprocket is located within the tubular portion it is of course to be understood that the wall of the tubular portion will be provided with suitable apertures through which the driving belt or chain 42 may pass.

In the present exemplification of the invention the steering mechanism is preferably located at the forward end of the tubular body portion or casing and preferably in close proximity to the tubular portion. In the exemplification of the invention shown in Figs. 2 and 5 of the drawings, the steering mechanism is located beneath the forwardly projecting hood or canopy and in close proximity to the front end of the tubular portion of the casing and this steering mechanism preferably comprises upright and horizontally disposed aeroplanes or rudders 43, 51 and 52, which may be supported for operation in any desired or suitable manner but preferably in the manner as will now be described. Supported by the front ring of the tubular body portion and beneath the forwardly projecting hood or canopy is a frame comprising an upright 45 and horizontal arms 46. The upright is preferably of a length substantially equal to the diameter of the casing and one extremity of the horizontal arms 46 projects laterally beyond the upright and is secured in any desired or suitable manner to the forward ring. The other extremities of the horizontal arms 46 project forwardly beyond the upright 45 for any desired or suitable distance and journaled between the forward extremity of these arms is a shaft 47 to which the upright aeroplanes or rudders 43 are secured so that when the shaft 47 is rotated in its bearings, the aeroplanes or rudders 43 will also be rotated. Suitable braces 48 may be provided for the rudder frame and some of these braces project beyond the upright shaft 47, and at the forward extremities thereof are arranged suitable bearings 49 for a horizontal shaft 50. These bearings 49 are located in such a position with respect to the lower edge of the projecting canopy or hood so that the shaft 50 which is journaled in these bearings will extend below the lower edge of the hood or canopy and the shaft is of such a length as to extend for some distance beyond the sides of the tubular body portion of the casing. Secured to the shaft 50 are spaced aeroplanes or rudders 51, 52, which are arranged in a substantially horizontal position. The aeroplane or rudder 51 is preferably arranged beneath the hood or canopy and is of a length substantially equal to the diameter of the tubular portion. This rudder or aeroplane is preferably provided with an enlarged aperture or opening 53ª through which the upright shaft 47 passes and which aperture will permit the free operation of the rudder or aeroplane 51 when the shaft 50 is rotated. The rudders or aeroplanes 52 are secured to the extremities of the shaft 50 beyond the sides of the casing and are preferably spaced a short distance from the ends of the horizontal rudder or aeroplane 51. With this improved construction it will be apparent that the upright rudders or aeroplanes 43, as well as the horizontally disposed rudders or aeroplanes 51, 52, may be readily operated independently of each other.

In the exemplification of the invention shown in Fig. 16 of the drawings the steering rudders or aeroplanes will be mounted in a similar manner below the forwardly projecting hood or canopy 33, while in the exemplification of the invention shown in Fig. 15 they will be mounted or supported by the forward ring and beyond the front end of the tubular body portion. The steering rudders or aeroplanes may be operated or controlled in any desired or suitable manner, but there is preferably provided laterally projecting arms 53 which are secured preferably to the lower extremity of the upright shaft 47 and secured to these arms are suitable flexible members 54 which are adapted to pass over a suitable drum 55 rotatably mounted upon a suitable support 56, which latter may be supported in any desired manner, preferably by means of the supporting bars or rods 41 of a car 56. Secured to the horizontal shaft 50 are similar arms 57 and secured to these arms are similar flexible members 58 which are adapted to pass over suitable drums or pulleys 59 secured to a shaft 60 which may be mounted in suitable bearings on the supports 41 and a suitable tiller wheel 61 may be secured to the shaft 60 for rotating the same to operate the horizontally disposed aeroplanes or rudders.

The motor 39 shown in the present exemplification of the invention is preferably of the explosion type and the fuel may be supplied thereto from tanks 62 which may be supported upon the framework in any suitable manner and in proximity to the motor.

The car 56 is provided with traction wheels 63 which are adapted to rest upon the ground when the machine is not in flight and the frames of these wheels may be provided with suitable brace rods 64 which may be connected to the rings 20.

Arranged above the body portion or motor casing are a plurality of bearings 65 which are spaced longitudinally from each other with respect to the casing and are supported in any desired or suitable manner, preferably by means of uprights 66 which latter may be secured in position to any suitable support preferably the rings 20 and the tie rods or bars 27. These bearings 65 may be spaced any desired or suitable distance from the top of the casing and journaled therein and extending longitudinally for substantially the entire length of the casing is a shaft 67 and supported by this shaft are transverse aeroplanes designated generally by the reference numerals 68, 69 in Fig. 5 of the drawings. These aeroplanes 68, 69, project laterally beyond the sides of the casing and are preferably spaced from each other longitudinally with respect to the casing so that one of the aeroplanes will be disposed at the forward and the other at the rear end of the casing. These aeroplanes preferably comprise spaced arms or members 70 (see Fig. 7) which are preferably arched longitudinally, as shown more clearly in Fig. 1 of the drawings and may be of any desired or suitable length. The inner extremities of these arms or members 70 are secured to a member 71, which latter may be of any desired size and configuration and one member 71 is provided for each diametrically opposite arm 70. These members 71 are secured to the shaft 67 and are spaced from each other a suitable distance according to the desired width of the aeroplane and each pair of members 71 is held from displacement with respect to each other by means of suitable tie rods or bolts 72.

The body portion of the aeroplanes may be constructed of any desired or suitable material but preferably of fabric 73, such as oil silk or the like. (See Fig. 8). This fabric may be secured to the arms 70, which latter are preferably tubular in construction, in any desired or suitable manner but preferably by forming a hem along the edges thereof into which the arms or members 70 are adapted to be inserted. After the fabric has been placed in position upon the arms, the arms may be braced throughout their length by means of suitable cross bars or rods 74 secured to suitable clips 75, which latter are removably clamped to the members 70 and also serve as means for securing the fabric or body portion of the aeroplanes against displacement. One of the bars or members 70 of each pair, preferably the rear one, is located in a horizontal plane below the horizontal plane of the forward bar or member 70, as shown more clearly in Fig. 5 of the drawings, thereby causing the body portion of the planes to be deflected rearwardly and downwardly to properly position the surface of the planes to be acted upon by the air. If desired, suitable tie rods 76 may be provided for bracing or reinforcing the aeroplanes. Projecting above the members 71 are additional supports 77 which extend for any desired distance above the members and may be connected by means of a cross bar or rod 78 and secured to this cross bar 78 are suitable tie rods 79 which extend longitudinally of the aeroplanes in any desired or suitable manner and serve as a means for supporting the free ends of the aeroplanes. Intermediate supports 80 may be provided for the tie rods 76 and 79, as shown more clearly in Fig. 1 of the drawings.

The aeroplanes thus constructed are mounted for pivotal movement in a plane transverse to the line of flight of the machine, and the members 71 of each aeroplane are secured for simultaneous pivotal movement so that when one side of the aeroplane is elevated, the other side will be depressed. Secured to one of the members 71 are arms or bars 81 which extend downwardly in an inclined direction on each side of the body portion or propeller casing. These arms or bars may be of any desired or suitable length so as to extend below the diametric center thereof and secured to their free extremities in any desired or suitable manner are weights 82. The arms or rods 81 are of such a length and weight and are so arranged with relation to the respective aeroplanes as to counterbalance the aeroplanes to maintain the equilibrium thereof. If desired, suitable brace rods 83 may be secured to the arms or rods 81 and to the side bars or members 70 of the aeroplanes for securing the arms 81 in position with relation to the aeroplanes and for assisting in supporting the free extremities of the arms. The arms 81 may be connected by means of a suitable flexible member 84 which is adapted to pass over a suitable drum 85, supported in any desired or suitable manner by means of the body portion or propeller casing and this flexible member 84 is wrapped one or more times around the drum and serves as a means for causing the arms to move in unison and for guiding the same. This drum 85 is adapted to move freely upon its supporting shaft to permit the aeroplanes to move about their points of pivotal support so that the aeroplanes will always assume the proper position with relation to the direction of the wind and the aeroplanes by being counterbalanced, the center of the wind pressure on the aeroplanes will always co-incide with the center of gravity of the machine, due to the fact that the aeroplanes are adapted to freely move and are counterbalanced and maintained in an equilibrium in any of its positions by the weighted arms 81. During the pivotal movement of the aeroplanes, the drum 85 revolves freely on its shaft and any suitable means may be provided for locking the aeroplanes against pivotal movement to hold them in a predetermined position. A suitable and efficient means for accomplishing this purpose will now be described.

The drum 85 is provided with a clutch member 85ª and a coöperating clutch member 85ᵇ is mounted for longitudinal movement upon the supporting shaft of the drum and is held against rotary movement. An operating lever 85ᶜ is provided for shifting the clutch member 85ᵇ and an elastic member 85ᵈ is provided for normally holding the clutch member 85ᵇ out of engagement with the clutch member 85ª. With this improved construction it will be apparent that when it is desired to lock the aeroplanes in any of their adjusted positions, all that is necessary is to shift the lever 85ᵇ against the tension of the elastic member 85ᵈ to cause the clutch member 85ᵇ to engage the clutch member 85ª and lock the drum against rotation. When it is desired to permit the aeroplanes to move freely about their pivot, the operating lever 85ᶜ may be released and the elastic member 85ᵈ will disengage the clutch members. One of these drums 85 and the coöperating clutch therefor being provided for each of the aeroplanes, it will be apparent that they may be separately controlled.

Suitable guy rods 86 may also be provided for connecting the extremities of the aeroplanes with the extremities of the arms or members 81 and a connecting member 87, such as a flexible member or the like, may also be provided for connecting the free extremities of the arms or bars 81.

In the exemplification of the invention shown in Fig. 10 of the drawings, the arms 70 or bars 81 project laterally from one of the members 71 in a substantially horizontal plane and the aeroplanes may be counterbalanced so as to maintain the equilibrium thereof by means of arms 88 which are pivotally secured to the free extremities of the arms 81 and depend therefrom for any desired distance, and connected to the free ends of these arms are the counterbalancing weights 82.

In the exemplification of the invention shown in Fig. 17 of the drawings the members 71, the shaft 67, the aeroplanes and the counterbalancing arms 81 are supported for bodily pivotal movement about the tubular body portion or propeller casing as an axis and in order to accomplish this result all of the above mentioned parts are supported upon an axially rotatable ring or member 89 which surrounds the propeller casing at any suitable point, preferably adjacent one of the rings 20 and disposed within the space between the ring 89 and the ring 20 is a coöperating member 90 which forms a race-way for suitable balls or anti-friction devices 91. These parts may be secured against displacement in any desired or suitable manner and when thus assembled, it will be apparent that the aeroplanes will be also mounted for pivotal movement under the influence of the air currents, which pivotal movement is a bodily movement of the aeroplanes and this counterbalancing means, about the tubular body portion or propeller casing as an axis.

In the exemplification of the invention shown in Fig. 18 of the drawings, the side bars or members 70 of the aeroplanes are secured directly to the ring or member 89 and the supports 77 are also secured to the ring 89 and project above the tubular body portion 20, the guy rods 89 in this exemplification of the invention extending from the top of the supports to and being connected with the aeroplanes in any suitable manner. In this exemplification of the invention the aeroplanes are mounted for bodily pivotal movement about the supporting casing 20 and are counterbalanced in the same manner as in the form shown in Fig. 17. With this improved construction it will be apparent that the car will always remain vertically suspended from the planes no matter from what direction the wind blows and that the center of gravity of the mechanism will always coincide with the center of the wind pressure by reason of the pivotal connection between the aeroplanes and the body portion of the machine. Furthermore, with this improved construction, the center of the wind pressure not only coincides with the center of gravity of the machine, but the latter extends well below the main plane surface, thereby assisting in maintaining the equilibrium. In use the air will be forced through the tubular casing at a greater rate of speed than the speed of the outside air which will not only suspend the machine in mid air but will also propel or advance the machine, the upward and downward flight of the machine being controlled by the horizontal or transverse aeroplanes or rudders 51, 52, and while the lateral deflection of the machine will be controlled by means of the upright aeroplanes or rudders 43.

By constructing the propeller in the manner in which applicant has constructed the same and of the necessary size whereby the required number of revolutions may be imparted thereto to advance and propel the machine, the propeller will also act as a gyroscope owing to its location and the manner of its mounting and the gyroscopic action of the propeller will serve as an additional means for maintaining the equilibrium of the machine. By providing the auxiliary or supplemental propeller 38ª which coöperates with the main propeller 38 to force the air through the casing, the eddy currents will be prevented and the auxiliary propeller will coöperate with the main propeller to assist the same in its gyroscopic action. Furthermore by constructing the body portion in such a manner that a hood or canopy projecting beyond one or both extremities of the tubular portion, an additional means will be provided which will assist in maintaining the equilibrium of the machine. If desired, and in order to furnish additional braces for the body portion or propeller casing suitable tie rods or bands 92 may be provided, which surround the casing adjacent the rings 20 and the extremities of these bands or rods may be connected by suitable clamps 93 by means of which the bands or rods may be tightened around the body portion.

In order that the invention might be fully understood, the details of the foregoing embodiment thereof have been thus specifically described, but

What I claim as new is—

1. A dirigible air ship including a tubular casing, a propeller in said casing for suspending and propelling the machine, a horizontally disposed rudder, said rudder comprising a plurality of sections, one of the said sections extending transversely across the inlet end of the casing, one of the remaining sections of the rudder projecting laterally beyond each side of the casing, and an upright rudder also disposed across the inlet end of the casing.

2. A dirigible air ship including a horizontally disposed tubular casing, a propeller within the casing for suspending and propelling the machine, an upright rudder disposed across one end of the casing, a horizontal rudder disposed across the same end of the casing, and comprising a plurality of sections, one of the sections extending across the end of the casing, and the remaining sections projecting laterally beyond the sides of the casing, means for independently controlling the rudders, a transverse aeroplane pivotally supported by the casing and projecting laterally beyond the casing, and means for maintaining the equilibrium of the said aeroplane.

3. A dirigible air ship including a horizontally disposed tubular casing, a propeller within the casing for suspending and propelling the machine, an upright rudder disposed across one end of the casing, a horizontal rudder disposed transversely across the same end of the casing, and within the plane of the wall of the casing, additional horizontal rudders at the same end of the casing located outside of the casing and movable with the horizontal rudder, means for independently controlling the upright and horizontal rudders, an aeroplane pivotally supported by the casing on an axis extending lengthwise of the casing, and means for counterbalancing the aeroplane.

4. An air ship including a tubular propeller casing, a rigid hood or canopy integral with and projecting beyond one end of the casing to form a continuation of the upper part of the casing, said hood conforming with the contour of the casing, an upright rudder, and a horizontal rudder, said rudders being disposed across the other end of the casing.

5. An air ship including a tubular propeller casing, a rigid hood or canopy integral with and projecting beyond one end of the casing to form a continuation of the upper part of the casing, said hood conforming with the contour of the casing, an upright rudder, a horizontal rudder, said rudders being disposed across the other end of the casing, and means for independently controlling said rudders.

6. An air ship including a tubular propeller casing, a hood or canopy projecting beyond the forward end of the casing to form a continuation of the upper part of the casing, and steering mechanism disposed across the forward end of the casing and beneath the said hood or canopy.

7. An air ship including a tubular propeller casing, a hood or canopy projecting beyond the forward end of the casing to form a continuation of the upper part of the casing, and steering mechanism disposed across the forward end of the casing and beneath the said hood or canopy, said steering mechanism including an upright, and a horizontally disposed rudder.

8. An air ship including a tubular propeller casing, a hood or canopy projecting beyond the forward end of the casing to form a continuation of the upper part of the casing, and steering mechanism disposed across the forward end of the casing and beneath the said hood or canopy, said steering mechanism including an upright and a horizontally disposed rudder, said horizontal rudder extending beyond the sides of the hood and the casing.

9. An air ship including a tubular propeller casing, a hood or canopy projecting beyond the forward end of the casing to form a continuation of the upper part of the casing, and steering mechanism disposed across the forward end of the casing and beneath the said hood or canopy, said steering mechanism including an upright and a horizontally disposed rudder, said horizontal rudder comprising sections spaced longitudinally from each other, one of the sections being disposed beneath the hood and the other sections being disposed beyond the sides of the hood and the casing.

10. An air ship including a tubular propeller casing, a rigid hood or canopy integral with and projecting beyond one end of the casing to form a continuation of the upper part of the casing, a propeller within the casing, an aeroplane supported by the casing for pivotal movement transversely to the line of flight of the machine on an axis extending lengthwise of the casing, and means connected with the aeroplane and fixed with relation thereto for maintaining the equilibrium of the said aeroplane.

11. An airship including a tubular propeller casing, a rigid hood or canopy projecting beyond one end of the casing to form a continuation of the upper part of the casing, a propeller within the casing, steering mechanism adjacent and extending across one end of the casing, an aeroplane supported by the casing for pivotal movement transversely to the line of flight of the machine, and means for maintaining the equilibrium of the said aeroplane.

12. An air ship including a tubular propeller casing, a rigid hood or canopy projecting beyond one end of the casing and arched transversely with respect to the casing to form the upper part of the casing, a propeller within the casing, an aeroplane pivotally supported by the casing on an axis extending longitudinally with respect to the casing and adjustable in a plane transverse to the line of flight of the machine, means for maintaining the equilibrium of the aeroplane, and steering mechanism disposed across one end of said casing.

13. An air ship including a tubular aerocasing, a propeller mounted within the casing, means for imparting motion to the propeller to force the air through the casing to suspend and propel the machine, the propeller acting as a gyroscope to maintain the equilibrium of the machine, an aeroplane mounted for pivotal movement with respect to the casing and on an axis extending longitudinally of the casing, and means fixed with relation to the aeroplane for maintaining the equilibrium thereof.

14. An air ship including a tubular casing, a propeller mounted within the casing, a rigid hood or canopy integral with and projecting beyond the end of the casing to form a continuation of the upper portion of the casing, means for imparting motion to the propeller to force the air through the casing to suspend and propel the machine, said propeller acting as a gyroscope to maintain the equilibrium of the machine, an aeroplane mounted for pivotal movement with respect to the casing on an axis extending longitudinally of the casing, and counterbalancing means for the aeroplane fixed with relation thereto.

15. An air ship including a tubular casing, a propeller mounted within the casing, a rigid hood or canopy integral with and projecting beyond both ends of the casing and arranged in the same plane to form continuations of the upper portion of the casing, means for imparting motion to the propeller to force the air through the casing to suspend and propel the machine, the propeller acting as a gyroscope to maintain the equilibrium of the machine, an aeroplane mounted for pivotal movement with respect to the casing and on an axis extending lengthwise of the casing, and counterbalancing means for maintaining the equilibrium of the aeroplane.

16. A dirigible air ship including a support, an aeroplane pivotally mounted upon the support and freely movable about its pivot under the influence of the wind pressure, and means fixed with relation to the aeroplane for counter-balancing the latter whereby the aeroplane will automatically adjust itself with relation to the support for maintaining the center of wind pressure in the vertical plane of the center of gravity.

17. A dirigible air ship including a support, an aeroplane pivotally mounted upon the support on an axis extending longitudinally with respect to the support and being freely movable transversely of the support by the wind pressure, and means fixed with relation to the aeroplanes for maintaining the equilibrium of the latter.

18. An air ship including a tubular aerocasing, a main propeller axially mounted within the casing, a casing extending at both ends beyond the propeller, means for imparting motion to the propeller, and an additional propeller mounted upon the shaft of the main propeller and spaced rearwardly therefrom, the additional propeller being less in diameter than the main propeller and of greater pitch, and the blades being disposed radially between the blades of the main propeller to prevent eddy currents about the latter in the casing.

In testimony whereof I have signed my name to this specification, in the presence of two subscribing witnesses, on this 17th day of August A. D. 1908.

ANTHONY R. SILVERSTON.

Witnesses:
J. W. F. ROTH,
U. A. JACKSON.